US006587432B1

(12) United States Patent
Putzolu et al.

(10) Patent No.: US 6,587,432 B1
(45) Date of Patent: Jul. 1, 2003

(54) METHOD AND SYSTEM FOR DIAGNOSING NETWORK CONGESTION USING MOBILE AGENTS

(75) Inventors: David M. Putzolu, Forest Grove, OR (US); Rajenda Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/386,552

(22) Filed: Aug. 31, 1999

(51) Int. Cl.[7] .............................................. G01R 31/08
(52) U.S. Cl. ...................................................... 370/229
(58) Field of Search ................................ 370/229–332, 370/329, 238, 351, 200, 400, 237; 325/434, 236.1, 465, 908, 445, 349, 331–338, 403–404; 709/223–225, 217–221, 216, 235–240; 455/433, 524; 707/26, 2–10; 345/966, 968; 379/134

(56) References Cited

U.S. PATENT DOCUMENTS

| | | | | | |
|---|---|---|---|---|---|
| 4,443,875 | A | * | 4/1984 | Blausten .................... | 370/448 |
| 4,827,411 | A | * | 5/1989 | Arrowood et al. .......... | 370/254 |
| 4,905,233 | A | * | 2/1990 | Cain et al. .................. | 370/237 |
| 5,608,733 | A | * | 3/1997 | Vallee et al. ................ | 370/394 |
| 5,870,557 | A | * | 2/1999 | Bellovin et al. ............ | 709/224 |
| 6,011,776 | A | * | 1/2000 | Berthaud et al. ........... | 370/232 |
| 6,011,777 | A | * | 1/2000 | Kunzinger .................. | 370/237 |
| 6,219,715 | B1 | * | 4/2001 | Ohno et al. ................. | 709/245 |
| 6,285,658 | B1 | * | 9/2001 | Packer ........................ | 370/229 |
| 6,343,073 | B1 | * | 1/2002 | Mashinsky .................. | 370/352 |
| 6,349,090 | B1 | * | 2/2002 | Lewis et al. ................. | 370/238 |
| 6,359,976 | B1 | * | 3/2002 | Kalyanpur et al. ......... | 379/134 |
| 6,377,543 | B1 | * | 4/2002 | Grover et al. .............. | 370/227 |

OTHER PUBLICATIONS

Papaioannou, T.; Edwards, "Using mobile agents to improve the alignment between manufacturing and its IT support systems," Apr. 30, 1999, Robotics and Autonomous Systems, vol. 27, Issue:1–2, pp. 45–57.*

Kumar, G. Prem, et al; "Artificial Intelligence approaches to network management: resent advances and a survey," Dec. 15, 1997, Computer Communications, vol.: 20, Issue 15, pp. 1313–1322.*

Reilly, James, et al; "Enabling mobile network managers", Sep. 1997, Computer Networks and ISDN Systems, vol. 29, Issue: 8–13, pp. 1417–1428.*

Zhang, Dianlong, et al; "Developing network management applications", Sep. 30, 1998, Computer Networks and ISDN Systems, vol. 30, Issue: 16–18, pp. 1551–1557.*

Perret, Stephane, et al; "Mobile assistant programming for efficient information access on the WWW", May 1996, vol. 28, Issue:11, pp. 1373–1383.*

(List continued on next page.)

Primary Examiner—Kwang Bin Yao
Assistant Examiner—Prenell Jones
(74) Attorney, Agent, or Firm—Kenyon & Kenyon

(57) ABSTRACT

A method and system analyze traffic on a network by monitoring network traffic and, when a particular network condition (for example, network congestion) is detected, gathering information about the traffic on the network by launching an agent and having the agent iteratively identify which of the links on the node on which the agent operates accepts a type or class of traffic, traverse the identified link to the node across the link, and repeat the process.

17 Claims, 9 Drawing Sheets

OTHER PUBLICATIONS

Shieh, Shiuh–Pyng, et al; "Optimal assignment of mobile agents for software authorization and protection", Jan. 1999, vol. 22, Issue: 1, pp. 46–55.*

ObjectSpace: Voyager Press Releases, ObjectSpace, Inc. Announces Voyager™, The World's First Platform for Agent–Enhanced Distributed Computing in Java™, http://www.objectspace.com/company/vgrpress, Apr. 2, 1997, pp. 1–4.

Mitsuru Oshima, Guenter Karjoth and Kouichi Ono, *Aglets Specification 1.1 Draft*, Sep. 8, 1998, http://www.trl.ibm.co.jp/aglets/spec11.html,; pp. 1–43.

Danny B. Lange, IBM Tokyo Research Laboratory, *Java Aglet Application Programming Interface (J–AAPI) White Paper—Draft 2*, http://www.trl.ibm.com.jp/aglets, Feb. 19, 1997, pp. 1–6.

IBM Co., *Aglets Software Development Kit—About Aglets* (visited Jul. 26, 1999), http://www.trl.ibm.co.jp/aglets/about.html, pp 1–2.

ObjectSpace, *Voyager Core Technology Version 2.0 Now Available* (visited Jan. 12, 1999). http://www.objectspace.com/products/voyager/core/index.html, pp. 1–8.

Bob Stewart, Cisco Systems, Inc., *Internet Draft Notification Log MIB*, http://www.ietf.org/internet-drafts/draft–ietf–disman–notif–log–mib–10.txt, Jun. 24, 1999 (visited Aug. 18, 1999), pp. 1–5 of 20 (code on pp. 6–20 available at http://www.ietf.org/internet-drafts/draft–ietf–disman–notif–log–mib–10.txt.

Bob Stewart, Cisco Systems, Inc., *Internet Draft Distributed Management Event MIB*, http://www.ietf.org/internet-drafts/draft–ietf–disman–event–mib–07.txt, Jun. 25, 1999 (visited Aug. 18, 1999), pp. 1–5 of 38 (code on pp. 6–38 available at http://www.ietf.org/internet-drafts/draft–ietf–disman–event–mib–07.txt).

Bob Stewart, Cisco Systems, Inc., *Internet Draft Distributed Management Expression MIB*, http://www.ietf.org/internet-drafts/draft–ietf–disman–event–mib–09.txt, Jun. 25, 1999 (visited Aug. 18, 1999), pp. 1–9 of 33 (code on pp. 10–33 available at http://www.ietf.org/internet-drafts/draft–ietf–disman–event–mib–09.txt).

Kenneth White, IBM Corp., *Definitions of Managed Objects for Remote Ping, Traceroute, and Lookup Operations*, http://www.ietf.org/internet-drafts/draft–ietf–disman–remops–mib–06.txt, Aug. 1999 (visited Aug. 18, 1999), pp. 1–10 of 60 (code on pp. 11–60 available at http://www.ietf.org/internet-drafts/draft–ietf–disman–remops–mib–06.txt.

D. Levi, Nortel Networks, J. Schoenwaelder, TU Braunschweig, *Definitions of Managed Objects for Scheduling Management Operations*, ftp://ftp.isi.edu/in–notes/rfc2591.txt, May 1999 (visited Aug. 19, 1999), pp. 1–5 of 22 (code on pp. 6–22 available at ftp://ftp.isi.edu/in–notes/rfc2591.txt.

D. Levi, Nortel Networks, J. Schoenwaelder, TU Braunschweig, *Definitions of Managed Objects for the Delegation of Management Scripts*, ftp://ftp.isi.edu/in–notes/rfc2592.txt, May 1999 (visited Aug. 19, 1999), pp. 1–10 of 47 (code on pp. 11–47 abailable at ftp://ftp.isi.edu/in–notes/rfc259.1txt.

* cited by examiner

METHOD AND SYSTEM FOR DIAGNOSING NETWORK CONGESTION USING MOBILE AGENTS

BACKGROUND OF THE INVENTION

I. Field of the Invention

This invention relates to computer systems, in particular to network environments.

II. Background Information

Organizations use networks consisting of nodes connected by links to share device capabilities and information and to allow users to communicate and exchange information. Each node may include networking equipment such as ports (also known as interfaces), which translate signals between the formats used by links and those used by nodes. Nodes may connect to multiple links, and each node has one port for each link to which it connects. A node may perform various functions; for example a node may run user applications and also act as a network management console. A node may be termed a host or a device, and may be a PC, workstation or laptop running a user application program, a router, an application gateway, a server, or any other device attached at some time to a network.

As network use and complexity increase, managing networks and diagnosing network problems becomes more difficult; particularly difficult problems are managing network loads and solving problems caused by excessive loads. The traffic load on a network may be unpredictable, may change over time, and may be unevenly distributed over the network. Links connecting network nodes, and other networking equipment such as routers or the equipment interfacing between nodes and links, have finite capacities. Increases in traffic may overload equipment, resulting in network performance degradation. Additional traffic which causes network slowdowns or breakdowns, which may be termed congestion traffic, may be created by small numbers of nodes and may affect only certain links and equipment. Congestion traffic may be any traffic which may be identified and, possibly, rerouted, halted or altered to alleviate an excess traffic condition on a network. Congestion traffic may be traffic which existed prior to an excess traffic condition, such as in the case where other additional traffic, when added to a network, causes an excess traffic condition. Congestion traffic may be that which is rerouted to a healthy link after an equipment failure (for example, damage to a link) or may be the traffic which existed on the healthy link prior to the failure; both sets of traffic cause an abnormal load on the healthy link. When used herein, a congestion condition may be any network state or condition which is caused by excess traffic on all or a portion of a network. For example, a congestion condition may be a condition where a port is receiving or being forced to send too many packets—network performance may be degraded.

Network operators may add or reallocate capacity or alter systems to cure congestion conditions. Links may be upgraded or added. Traffic carrying capacity may be moved from one area of a network to another. Routing tables may be altered to reroute congestion traffic along less used paths. Traffic may be divided into classes with different priorities in an effort to provide better service to high priority applications.

Adding or reallocating network equipment or altering systems is expensive and consumes time and resources. Before doing so it is desirable to have accurate information including the source, destination, and type of congestion traffic. Overall, a knowledge of the distributed state of a network—details on traffic flow, paths and type—is required to quickly and efficiently alleviate congestion conditions. Often equipment or systems are added or reallocated based only on an operator's educated guess as to where the problem lies and how big the problem is. This results in inefficiencies. It is desirable, therefore, to have a system which collects detailed and useful data on congestion or other network conditions.

Certain information about the state of a network may only be gathered accurately and quickly at individual nodes distributed throughout a network—for example, statistics on the source of traffic reaching a node or the functioning of node ports. Currently, gathering such information requires that an operator physically access individual nodes, e.g., by using a sniffer, or that a central console query remote nodes.

Systems exist for collecting information about network traffic. The distributed state of a network may be collected at a central management console which polls remote network nodes. The distributed state of a network may also be determined by physically accessing each node. For example, diagnosing a congestion condition may require determining the source of the greatest amount of traffic received at a node and the paths taken by such traffic. A path taken by traffic may be described as the equipment traversed by traffic as the traffic crosses a network or networks (e.g., a series of nodes and links, or a series of sub-networks).

An operator may access a node and analyze incoming traffic using a sniffer, a device recording network statistics. An operator may determine which of the physical links attached to a node is receiving a certain type of traffic, and which node is the source of that traffic. The paths of traffic from the source may be found by traversing the network from node to node, using the sniffer at each node, until the source node is reached. Such a diagnosis is slow and inaccurate. A similar analysis may be performed from a central console which queries remote nodes for information about the source of incoming traffic. This method is also slow and inaccurate, as it requires communication with nodes across the network. The speed at which congestion occurs and must be stopped makes such detection methods ineffective.

Existing methods for analyzing network traffic are slow, inefficient, and inaccurate. The time taken to perform such operations results in inaccuracy, as the state of a network is ascertained over a period of time. Inaccuracies and delays may also occur, if (as may happen during a congestion condition), data transmission over links is interrupted or halted. The state of a network is not always accurately viewed from one central point which has only indirect access to the state of remote network nodes.

Therefore there exists a need for a system and method allowing for the distributed state of a network, such as information about congestion traffic, to be quickly and accurately collected. A system and method are needed for quickly and accurately determining information about traffic between nodes, such as the path or paths of such traffic.

SUMMARY OF THE INVENTION

A method and system are disclosed for analyzing traffic on a network by monitoring network traffic and, when a particular network condition (for example, network congestion) is detected, gathering information about the traffic on the network by launching an agent and having the agent iteratively identify which of the links on the node on which the agent operates accepts a type or class of traffic, traverse the identified link to the node across the link, and repeat the process.

DETAILED DESCRIPTION

I. OVERVIEW

Figure 1:
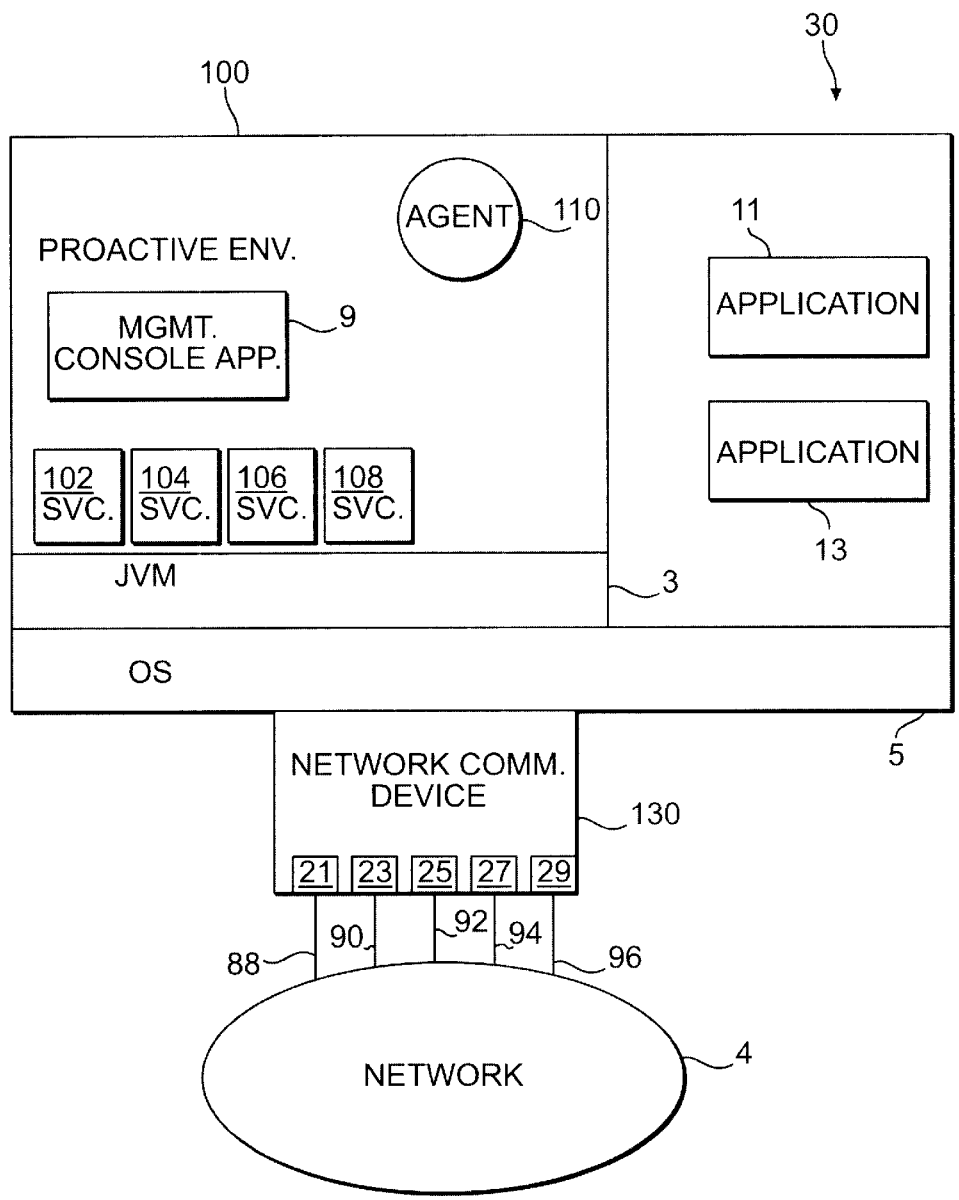
FIG. 1 is a block diagram illustrating a network node according to an embodiment of the present invention.

The system and method of an exemplary embodiment of the present invention use agents—mobile software module—to collect data on the state of a network and to gather that data at a central location, allowing for more accurate diagnosis of network conditions. In particular, during a congestion condition, the system and method of the present invention allow for details on the traffic causing the congestion—the sources and destinations of such traffic, paths taken by such traffic, or other information—to be gathered. Such information then may be used by a network administrator to cure the problem by, for example, efficiently adding or reconfiguring network equipment.

When used herein, an agent is a software module having the capability to move from node to node on a network and to execute on the nodes to which it moves. In an exemplary embodiment of the present invention an agent may be, for example, an application functioning to diagnose or report on network conditions, but may also provide other functionality, such as altering a routing table or serving as a user application. When used herein, a network condition may describe any state of the network, for example, a condition where the network is behaving normally, a condition where there is an abnormal amount of traffic, or a condition where the network is not functioning properly. A network condition may be a congestion condition.

In an exemplary embodiment of the system and method of the present invention, network congestion is detected and diagnosed by two types of agents. A first type of agent, a traffic monitoring agent (referred to as a monitoring agent), is positioned at selected network nodes. On detecting network congestion, a monitoring agent creates a second type of agent, a traffic trace back agent (referred to as a trace agent), which analyzes traffic received at or sent by the node supporting the monitoring agent by moving through the network and gathering information. The monitoring agent is stationary. In an alternate embodiment a monitoring agent may launch a trace agent to trace traffic on a network other than that which the monitoring agent resides. In such a case the monitoring agent monitors congestion on the remote network.

Information gathered by the trace agent may include the paths taken by traffic to reach the monitoring agent's node, or other information. The trace agent is a mobile agent capable of executing on a node of a network, stopping execution, transporting itself to another node, and resuming execution. In an alternate embodiment, a stationary monitoring agent may not be needed; a trace agent may collect data without the prompting or direction of such a monitoring agent. Furthermore, the monitoring agent may exist as a process other than an agent; for example, a monitoring agent may be replaced by a stationary C++ application.

An agent may require a certain mobile agent environment or platform to operate and may not be able to operate on every node on a network. An exemplary embodiment of the system and method of the present invention uses a particular mobile agent environment, termed a proactive environment, to create and support mobile agents. Alternate embodiments may use other systems to provide agents with such capabilities. For example, other mobile agent environments may be used, or types of agents may be used which may operate without the aid of such an environment.

In an exemplary embodiment, before deploying trace agents, a monitoring agent determines which node or nodes in the network are sources of significant amounts of the traffic received at the node on which the monitoring agent operates. A large amount of traffic received from one source may be identified as being congestion traffic. For each of these identified nodes the monitoring agent instantiates a trace agent to trace traffic. In an iterative manner, the monitoring agent selects a node identified as a source of traffic, instantiates a trace agent to trace the traffic from that node, waits for the trace agent to report, destroys the trace agent, then selects the next node identified as a source of traffic and repeats the process. Each trace agent is given a node (its "given node") for which it is to trace traffic. The trace agent iteratively follows a process whereby it determines which of the multiple ports on the node on which it currently operates (its "current node") is receiving the most traffic from its given node, attempts to traverse the link connected to that port (i.e., to move to the node on the other side of the link), and, at the new node, repeats this process. In such a manner the trace agent determines the path taken by the traffic from its given node to the node on which the monitoring agent operates, and, possibly, gathers information about that traffic and on other traffic on the links it traverses and the nodes on which it operates. After gathering such information each trace agent reports to the monitoring agent, which, in turn, may report to a human operator or, possibly, attempt to cure the congestion condition.

Gathering information about network congestion using mobile agents is much quicker than gathering such information by having a human operator travel from node to node, and is also quicker than polling nodes from a central location. Increases in load may be transient, for example, in the case of a server receiving an abnormal number of requests during a brief period; the only effective diagnosis may be one that takes place during this brief period. Mobile agents may determine, without exchanging information or commands from a central location or human operator, which path to take to further investigate a network condition. Gathering congestion information using such agents is more accurate than using other methods. Since communication between a central console and a remote node is not required, a finer granularity of information may be collected and acted upon. Accuracy is improved by the speed at which agents may gather, process, and act on information.

A trace agent may be launched from one node but begin tracing traffic at a different node. For example, the node at which a monitoring agent detects congestion may determine that the congestion actually exists along a path not including that node. The monitoring agent launches a trace agent and directs the trace agent to move to a node which is along the path of the suspected congestion before starting tracing.

An embodiment of the system and method of the present invention may operate within a network which divides traffic into classes having different priorities. Such an embodiment may, for example, treat traffic of differing priorities equally for the purposes of diagnosing network congestion.

II. PROACTIVE ENVIRONMENT

An exemplary embodiment of the system and method of the present invention requires agents to be able to migrate among nodes, executing and performing tasks at each node, and to have access to resources at each node. An exemplary embodiment uses a particular mobile agent environment, termed a proactive environment, to create and support agents with these capabilities. Alternate embodiments may not require the particular mobile agent environment described herein, or may not require a mobile agent environment separate from an operating system.

An embodiment of the proactive environment used with the present invention allows mobile agents to operate on network nodes and access node and network resources through services. Resources may be any data structure, function, or physical component to which a node allows access. For example, a resource may be the ability to create and alter files; such a resource is normally provided by an operating system. A resource may be a port, the ability to send Simple Network Management Protocol ("SNMP") messages, or the ability to execute a native code (e.g., machine code) component. A resource may also be the ability to output information to a display (e.g., a CRT or flat panel display), produce sounds, or accept keyboard or pointing device input.

In an exemplary embodiment of the present invention, a proactive environment exists on multiple nodes in a network; one proactive environment exists on each node which may support a proactive environment. Each proactive environment can create agents (and is thus the agents' "launch point"), provides a platform allowing agents to run, allows agents access to resources through services, monitors and controls agents, allows agents to travel via the network to other proactive environments, may receive agents transmitted from other proactive environments, and in addition may perform other network administration functions. A proactive environment enables an agent to operate on one node, stop execution, transfer to another node, and resume execution.

In an exemplary embodiment, an agent may access certain resources only if the agent has permission to do so. Services are used to allow agents restricted access to resources by acting as intermediaries between the agents and the underlying resources. Services may allow access to resources (e.g., a routing table) or may emulate the function of resources (e.g., executing non-Java code). For example, a service altering a routing table may accept a routing table entry to be altered. Security is provided, as agents require permissioning to use services, and services may constrain access to resources. Permissioning is achieved by having each agent carry with it an access control list which is a permission list determining which services it may access, and other security information. Services may grant access to resources in a node, platform, and application independent manner.

In an exemplary embodiment services may be circumscribed, or may be tailored based on agent permissioning. Services may be circumscribed in that a service may allow access to only a portion of an underlying resource. Services may be tailored in that a service may allow access to only portions of underlying resources based on agent permissioning—different agents, having different permissioning, may be able to access different aspects of resources.

Referring to the figures in which like numbers indicate like elements, FIG. 1 is a block diagram illustrating a network node 30 according to an embodiment of the present invention. Node 30 may be a standard personal computer or another type of data processing device, and in addition, may include components not traditionally found in a standard personal computer. Node 30 is a device connected to a network 4 via network communications device 130. Node 30 includes proactive environment 100, which includes services 102, 104, 106 and 108 and which provides an environment on which agents, such as agent 110, may run. Node 30 includes operating system ("OS") 5, providing overall control of node 30; Java™ virtual machine ("JVM") 3, providing a platform on which proactive environment 100 operates; and management console application 9, providing a user interface for monitoring and control of proactive environment 100 and other entities. Node 30 includes applications 11 and 13, providing functionality, such as word processing, to a user. Services 102–108 provide agent 110 access to resources, such as access to network 4, OS 5, or other resources.

Network 4 provides connectivity and communications with other networks (not shown) and with other network nodes (not shown). Network communications device 130 allows node 30 to connect to network 4 via links 88, 90, 92, 94, and 96, which connect to other nodes in network 4 (not shown). Network communications device 130 includes ports 21, 23, 25, 27 and 29, which translate signals between the formats and methods used by links and those used by nodes (e.g., between an analog format used by a link and a digital format used by a node), and which possibly perform other functions.

Configuration and control of node 30, agent 110, services 102–108, and also of other nodes, agents, and services which may exist on nodes which are part of network 4 may be accomplished through management console application 9, which allows a human operator to communicate with, monitor, and send commands to proactive environments and other entities.

In an exemplary embodiment of the present invention proactive environment 100 creates agents, provides a platform allowing agents to run, monitors and controls agents, allows agents to travel via network 4 to other proactive environments, may receive agents transmitted from other proactive environments, and in addition may perform other functions. Proactive environment 100 interfaces with a human operator using management console application 9. Proactive environment 100 is a Java™ object which runs on JVM 3, itself a program running on node 30. Proactive environment 100 is implemented as an extension of the Voyager™ system, which defines a Java™ program allowing agents to operate. Alternate embodiments of the system and method of the present invention may use alternate forms of the proactive environment described herein, or may not require the use of a proactive environment.

In an exemplary embodiment proactive environment 100 provides an interface to agent 110 including services 102–108. Services 102–108 are Java™ classes which may be instantiated as objects which run on the JVM 3; the objects contain methods which accept inputs from agents and allow agents access to resources. Services are members of a proactive environment; services 102–108 are members of proactive environment 100. Agent 110 may access services 102–108 by requesting proactive environment 100 to instantiate a service object; the agent then may invoke methods of the service object, which are Java™ methods. Services may, if so created, have access to any resource on node 30 or network 4 to which JVM 3 itself has access, e.g., file creation, SNMP messages, routing tables, or display output.

Figure 2:
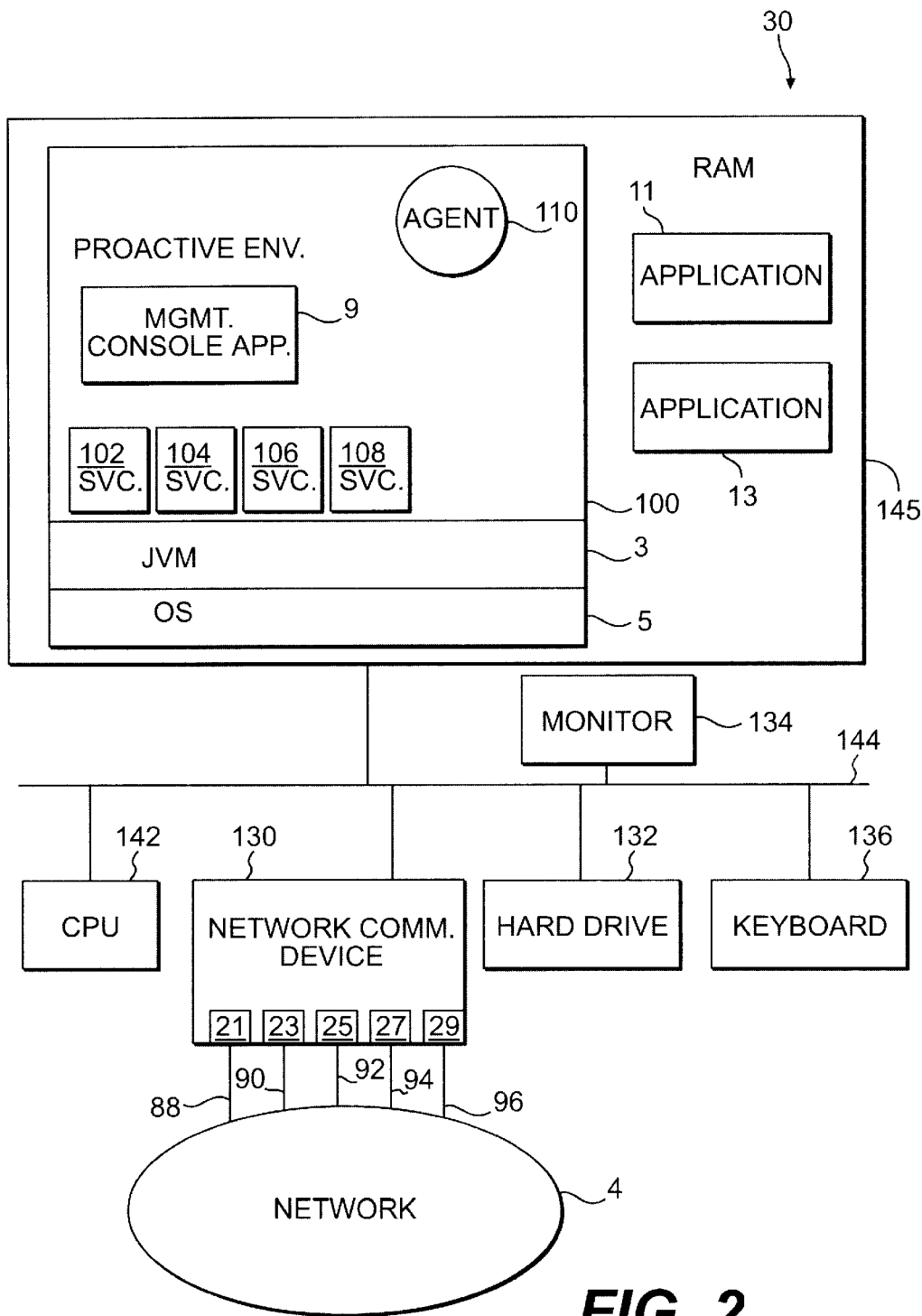
FIG. 2 is a block diagram illustrating the node of FIG. 1 according to an embodiment of the present invention.

FIG. 2 is a block diagram illustrating node 30 of FIG. 1 according to an embodiment of the present invention. FIGS. 1 and 2 illustrate node 30 from different aspects; thus like numbered components are identical in function and structure. Node 30 includes a central processing unit ("CPU") 142 connected to a system bus 144. CPU 142 executes instructions and controls the operation of node 30. CPU 142 may be, for example, a Pentium® processor available from Intel® Corp. System bus 144 allows the various components of node 30 to communicate, and may alternatively include a plurality of busses or a combination of busses and bus bridge circuits. Node 30 further includes RAM 145, providing non-permanent storage of data and program instructions; and a plurality of peripheral devices 130, 132, 134, and 136, including keyboard 136, allowing user input; network communications device 130; hard disk drive 132, allowing for long term storage of information; and monitor 134, displaying information to a user. Node 30 may include other peripheral devices not shown, such as a printer or a mouse. Node 30 includes OS 5, JVM 3, management console application 9, agent 110, proactive environment 100, services 102, 104, 106 and 108, and applications 11 and 13. Services 102–108 provide agent 110 access to resources, such as access to network communications device 130, hard disk drive 132, monitor 134, OS 5, or other resources. A portion of application programs 11 and 13, proactive environment 100, services 102–108, agent 110, JVM 3, management console application 9, and OS 5 are stored in RAM 145, are executed by CPU 142, and to an extent control the operation of node 30 in cooperation with other components such as CPU 142.

Network communications device 130 allows node 30 to connect to network 4 via links 88, 90, 92, 94, and 96, which connect to other nodes in network 4 (not shown). Network communications device 130 includes ports 21, 23, 25, 27 and 29, which translate signals between the formats used by links and those used by nodes, and which possibly perform other functions. Each of ports 21–29 maintains information about its functioning, such as discard counts and queue lengths. Packets may be dropped by a port if its buffers become full when the port receives packets at a rate which is faster than the rate it can send the packets to its host node. The average queue length of a buffer in a port is a measure of how full the buffer is. This information is available to processes running on node 30, and may be available to agents running on node 30 or on other nodes (not shown), through the use of services.

Figure 3:
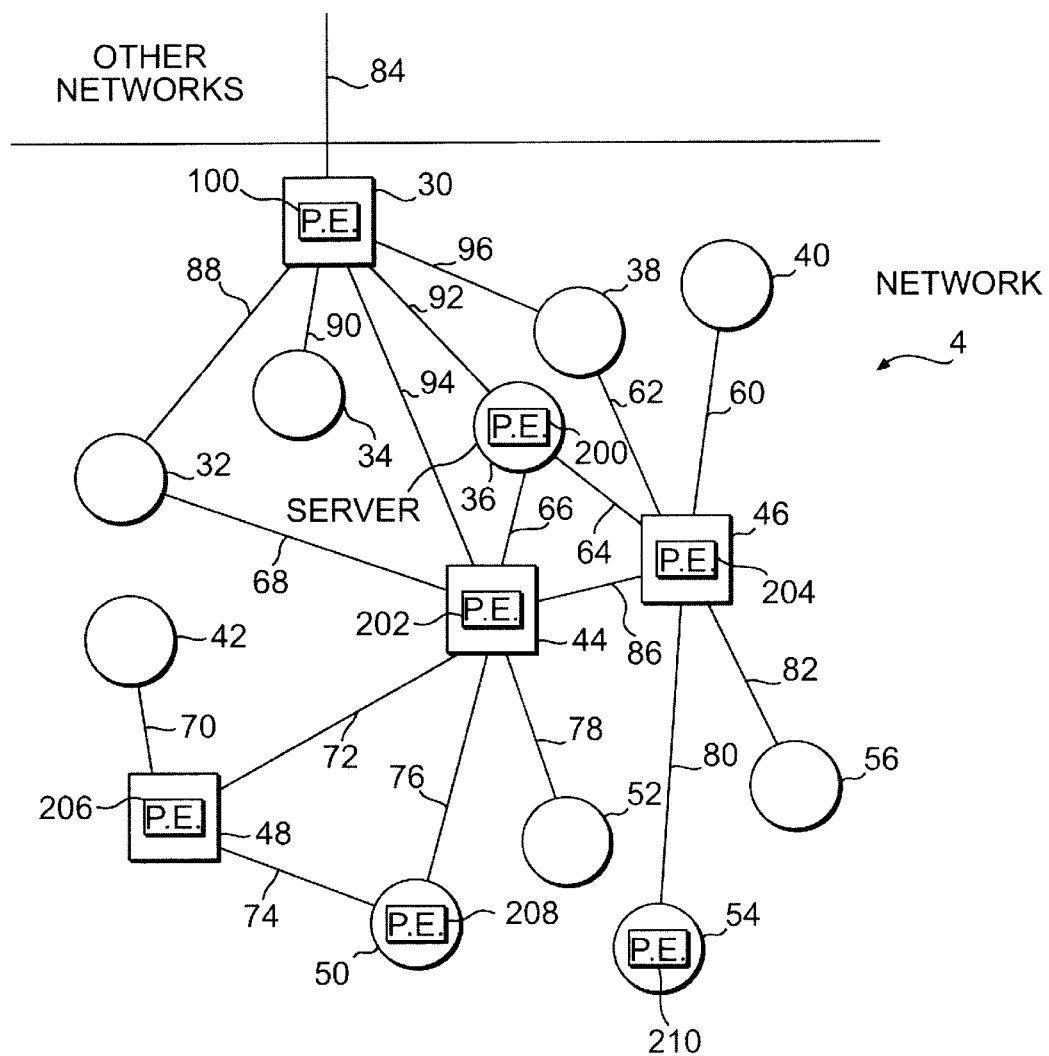
FIG. 3 is a block diagram illustrating the network of FIG. 1 according to an embodiment of the present invention.

FIG. 3 is a block diagram illustrating network 4 of FIG. 1 according to an embodiment of the present invention. In an exemplary embodiment network 4 includes nodes 30, 32, 34, 36, 38, 40, 42, 44, 46, 48, 50, 52, 54 and 56, providing user functionality, routing traffic, providing network security, and performing other functions; and links 60, 62, 64, 66, 68, 70, 72, 74, 76, 78, 80, 82, 84, 86, 88, 90, 92, 94 and 96, connecting and transmitting data between nodes 30–56. Links 60–96 may be, for example, coaxial cable, twisted pair cable, or fiber-optic cable, but can be any transmission medium capable of transporting traffic. In alternate embodiments, the system and method of the present invention may work with networks having a structure other than that described.

Node 30 is a gateway, providing network 4 access to other networks, such as the Internet, and acting as a firewall. Link 84 transmits data between node 30 and other networks. Nodes 30, 44, 46 and 48 are routers, accepting traffic and routing the traffic to destinations, or to other nodes which then forward the traffic to destinations. Nodes 32, 34, 38, 40, 42, 50, 52, 54, and 56 are PCs, supporting applications and providing functionality to users, such as word processing functionality. Node 36 is a file server, storing files and allowing other nodes access to the files; node 36 has some routing capability. Nodes 30 and 44 support management console applications. Management console application 9, supported by node 30, is depicted in FIG. 1; for the sake of clarity the management console application on node 44 is not depicted. While nodes having certain definitions and functions are depicted, the nodes of network 4 may be any devices, for example, workstations.

Nodes 30, 36, 44, 46, 48, 50 and 54 maintain proactive environments 100, 200, 202, 204, 206, 208 and 210, respectively. Each node on which agents may operate maintains a proactive environment. In an exemplary embodiment of the present invention all nodes which are involved in network functions (e.g., routers, firewalls, management devices) and which may support a mobile agent environment such as a proactive environment do so (some nodes on a network may not have the ability to support a proactive environment). Some nodes not involved in network functions, such as PCs providing user functionality, may also support a mobile agent environment.

Nodes 30–56 may communicate using the physical network (i.e., links 60–96 and nodes 30–56) and various layers of protocols. Similarly, objects, such as agents and proactive environments, and applications, may communicate using network 4 and various protocols. Such methods are well known in the networking art.

One method for allowing network nodes or modules on nodes to communicate is the TCP/IP transport protocol. Every node connected to a network using TCP/IP has an internet protocol ("IP") address, four numbers separated periods. This IP address may be used to name the node. Some nodes may have more than one IP address.

Each proactive environment on network 4 creates agents, provides an operating environment for agents, allows agents to migrate among nodes which are part of network 4, monitors and controls agents, and provides agents access at each node to a certain set of resources. An agent existing on a proactive environment on one node of network 4 may move to a proactive environment on another node. For example, an agent running on node 36 may move, via link 66, to node 44. Proactive environments and agents communicate with other proactive environments or agents, both within a node or across a network, using a service which transmits messages. The service uses a remote procedure call ("RPC") system, defined by the Voyager™ system. Messaging techniques using RPC methods are known.

In an exemplary embodiment an agent is instantiated by a proactive environment using the Java™ language "new" keyword; a variable referencing the agent is returned to the proactive environment. Each proactive environment and instantiated agent has a unique name, stored as a string. Each instantiated agent may be referred to initially by the local variable used to refer to the object when it is created. Each agent may be referred to globally by its agent name.

In an exemplary embodiment of the present invention, the various types of agents which carry out the functionality of the system and method of the present invention are mobile Java™ objects which may run within a proactive environment. Proactive environments may be hosted on devices running a JVM. A base "agent" object class provides an agent with basic functionality, such as the ability to migrate from node to node, permissioning capability, the ability to communicate with proactive environments and other agents, and the ability to use services. Additional capabilities may be provided by creating subclasses of the agent base class. Each type of agent is given unique functionality in addition to the functionality provided by a base class or an enhanced base subclass (e.g., the ability to function as a firewall) by adding a work object (a Java™ object) and possibly one or more worksheets (objects containing Java™ language code or code in another language). A subclass of the agent base class includes methods to add a work object and worksheets to instantiated agents.

When an agent begins execution at a node, a controlling method (the first method to be started when an agent is invoked) executes the work object; the work object may invoke a worksheet. A work object may invoke a different worksheet at each different node or may invoke the same worksheet at each node. A work object may have only one worksheet available, and thus may not make a choice based on a current node, or may not use worksheets. In an exemplary embodiment worksheets are objects which are members of an agent. A worksheet may be a Java™ language worksheet or a non-Java™ language worksheet. A work object invokes a non-Java™ language worksheet by passing the object to a service, which emulates the running of the worksheet in the language of the worksheet. A Java™ worksheet is executed by calling the worksheet. Creating a base class and enhancing its features with additional functionality by creating subclasses is well known in the Java™ language and object oriented programing arts.

After an agent is instantiated, a work object and worksheets which provide unique functionality may be added to the agent by invoking a method which is a member of the agent. The method is passed the work object and worksheets.

In an alternate embodiment each type of agent is given unique additional functionality by adding class members (methods and variables) to the base agent class definition; each type of agent is a subclass of the agent base class. Alternate embodiments may provide different methods for varying functionality of agents. For example, work objects and worksheets may be created using different methods, or may not be used.

Referring to FIG. 3, an agent according to an exemplary embodiment of the present invention is capable of executing on a mobile agent environment (specifically a proactive environment) installed on one node of network 4, stopping execution, transporting itself along with state information to a mobile agent environment on another node of network 4, and resuming execution. In an exemplary embodiment the state includes information contained in members of the agent, such as data, a work object, worksheets, and an access control list. However, in alternate embodiments an agent's state may include any data created when an agent is instantiated or after an agent is instantiated, for example associated information stored as agent members, or the point at which the agent stopped execution, possibly in the form of an instruction pointer.

In an exemplary embodiment of the present invention, an agent moves by invoking a move method of the agent, defined in the agent base class, which accepts a location (in the form of a string) referring to a destination proactive environment. The agent's move method calls a move method of the proactive environment on which the agent operates. The proactive environment in turn moves the agent object by halting the agent and transmitting its code and data via the network to the target proactive environment. The proactive environment uses Java™ serialization to serialize the agent, storing all agent member variables in a file or in RAM. This data is transmitted to the destination proactive environment as a buffer of bytes along with the agents's code, which is stored in the form of a Java™ class file. Agent information is encrypted before it is sent and decrypted by the receiving proactive environment. The receiving proactive environment uses Java™ methods to load the agent based on the class file and instantiate the agent's members based on the received agent data. The receiving proactive environment determines from the agent's access control list if the agent has permission to operate. If, according to the access control list, the agent does not have permission to operate on the proactive environment, the proactive environment which launched the agent is informed; if that proactive environment launched the agent due to a command from another application (e.g., a management console application) the proactive environment may inform that application.

If the agent does have permission, the proactive environment starts executing the agent by calling the agent's controlling method. The controlling method starts the operation of the agent. The controlling method may invoke the work object to operate the agent or may operate the agent itself. The work object may then in turn call a worksheet. The work object may query the proactive environment for the proactive environment's name and, based on this name, determine which worksheet is to be invoked. Alternate methods of moving agents may be used.

Figure 4:
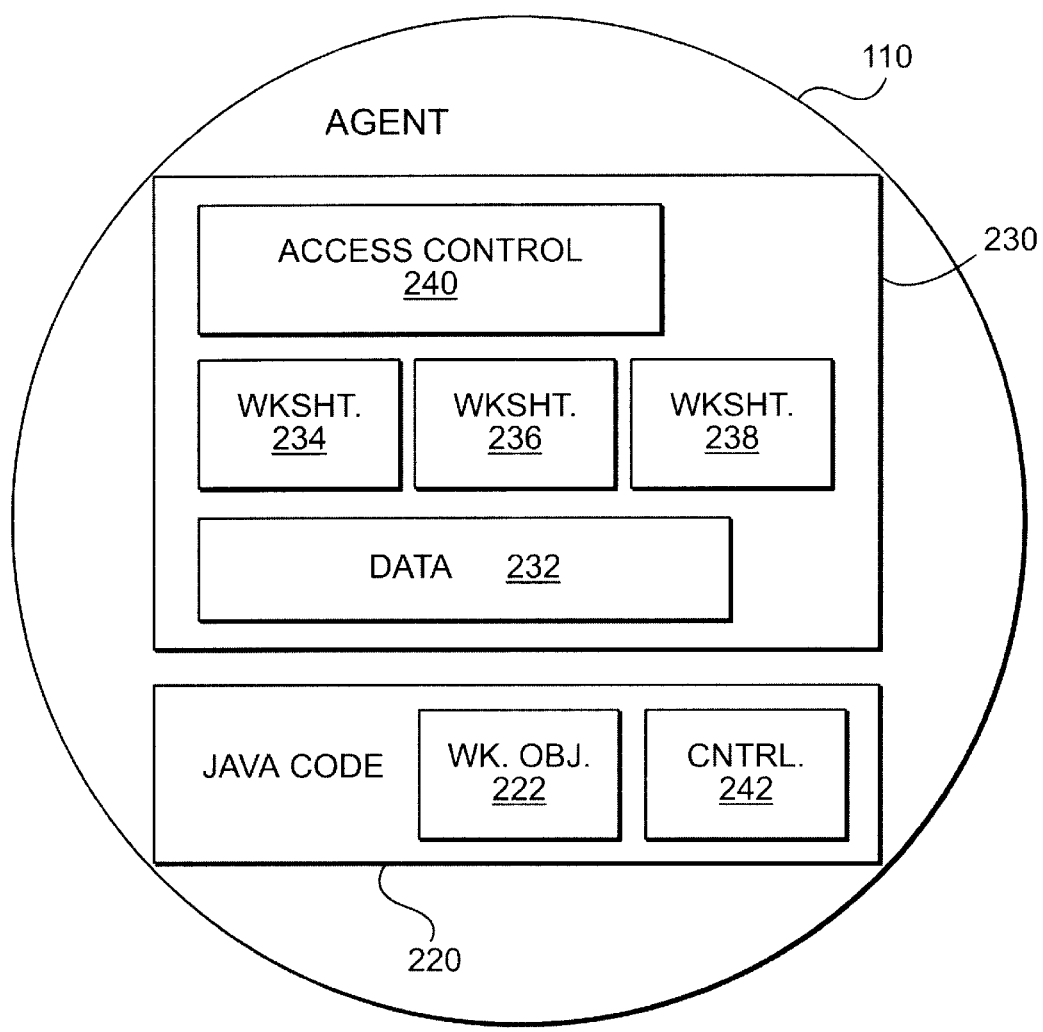
FIG. 4 is a block diagram illustrating the instantiated agent of FIG. 1 according to an embodiment of the present invention.

FIG. 4 is a block diagram illustrating instantiated agent 110 of FIG. 1 according to an embodiment of the present invention. In an exemplary embodiment agent 110 includes code segment 220, which is comprised of Java™ methods which are members of agent 110 and which provide functionality to agent 110; and state 230. Code segment 220 includes work object 222 providing functionality to agent 110. State 230 includes worksheets 234, 236 and 238; work object 222 may use worksheets 234–38 to provide functionality to agent 110. Worksheets 234–38 are members of agent 110 which may be Java™ or non-Java™ language code segments. Worksheets 234–38 may perform tasks such as monitoring port statistics, CPU utilization, or reachability to other nodes. Worksheets 234–38 may use services to perform some tasks. Code segment 220 includes a controlling method 242, the first method invoked when agent 110 is started on a node, which may contain code controlling agent 110 and executing work object 222. Controlling method 242 controls the overall operation of agent 110; controlling method 110 may invoke other methods of agent 110 or other methods made available by the proactive environment or JVM on which agent 110 operates (not shown).

State 230 includes access control list 240, a list determining, for agent 110, which services may be used on which devices, how those services may be used, and on which devices agent 110 may be run. State 230 includes data segment 232, which contains run time data agent 110 may have instantiated. Access control list 240, work object 222, data 232 and worksheets 234–38 are variables which are members of agent 110. A variable may represent an object, as in the case of work objects. Access control list 240 lists devices on which agent 110 may operate, and for each device the services and, in some cases, capabilities within services, which agent 110 may use on that device. Agent 110 may only operate on the devices listed in access control list 240. Alternate embodiments may provide other methods and structures for recording permissioning of agents. Alternate embodiments may provide a different structure for agents.

In an exemplary embodiment, to ensure the integrity and source of agent 110, when it is transmitted across the network by a transmitting proactive environment it is signed using a digital signature and encrypted. Only authorized entities may decrypt, access and execute agent 110. A proactive environment receiving agent 110 may use the digital signature to ensure the integrity and source of agent 110. Encryption and verification methods are well known. Alternate embodiments may provide other methods for encrypting or protecting agents' data.

Agent 110 may operate in several modes, where each mode dictates how agent 110 may act. For example, if agent 110 monitors a network for congestion it may operate in a monitoring mode, and on detecting congestion may transition to a responding mode. Another type of agent, for example a trace agent, may have different modes. The mode in which agent 110 exists is recorded as a variable in state 230. When agent 110 is started on a node (as the result of initial instantiation or after moving) the mode determines the activity controlling method 242, work object 222 or worksheets 234–38 carry out.

In alternate embodiments other methods may be used to create the agents used with the present invention, and the agents used with the present invention may have alternate structures. For example, alternate embodiments may not require agents to have a controlling method, work objects or worksheets. In alternate embodiments the agents of the system and method of the present invention may be implemented using tools other than the Java™ language and the Voyager™ system, such as C++, or a system not having object oriented capability.

A typical JVM allows certain Java™ objects to operate in a "sandbox," and does not allow these objects to have access to resources outside the sandbox. Agents, Java™ objects running inside the sandbox, may access resources outside the Java™ sandbox through services.

In an exemplary embodiment services are classes defining objects which contain methods accepting inputs from agents and allowing agents access to resources. The objects are Java™ objects running on the JVM.

In an exemplary embodiment an agent calling a service makes a request for the service to the proactive environment on which the service runs. The proactive environment accesses the agent's access control list to determine if, and to what extent, the agent may access the service. Certain services (and thus the underlying resources) may only be accessed by agents which have the proper permissioning. The proactive environment creates an object which is an instance of the service. If the service may be created so as to provide various levels of capabilities based on permissioning, variables, members of the service object, are set to indicate which aspects of the service the agent may access; this is done per the agent's access control list. In such a case the service methods provide access to resources only if associated variables, indicating permissioning, are properly set. Instantiated services provide methods which accept input from agents and may return output to agents. The service object is passed to the agent, which may call methods of the object to access the underlying resources. When used herein, service may refer to the class defining a service or to an object instantiated based on that service class. Furthermore, an agent accessing or calling a method within a service object may be said to be accessing or calling that service. In alternate embodiments a service may be any system or module allowing an agent to access resources.

A service method may pass data back to a calling agent as a return value, in the manner typical of method or function calls; event handling may also be used to pass data between services and agents.

In one embodiment of the present invention services may grant access to nodes which do not support a proactive environment. A proxy device, a node which can support a proactive environment, may allow an agent access to a node which cannot support a proactive environment (a "legacy device"). An agent may manage devices via services which are provided on a proxy device which can be used to monitor or control managed devices via, for example, SNMP or command line interface (CLI). Thus an agent may access, for example, data on a port on a remote device.

Figure 5:
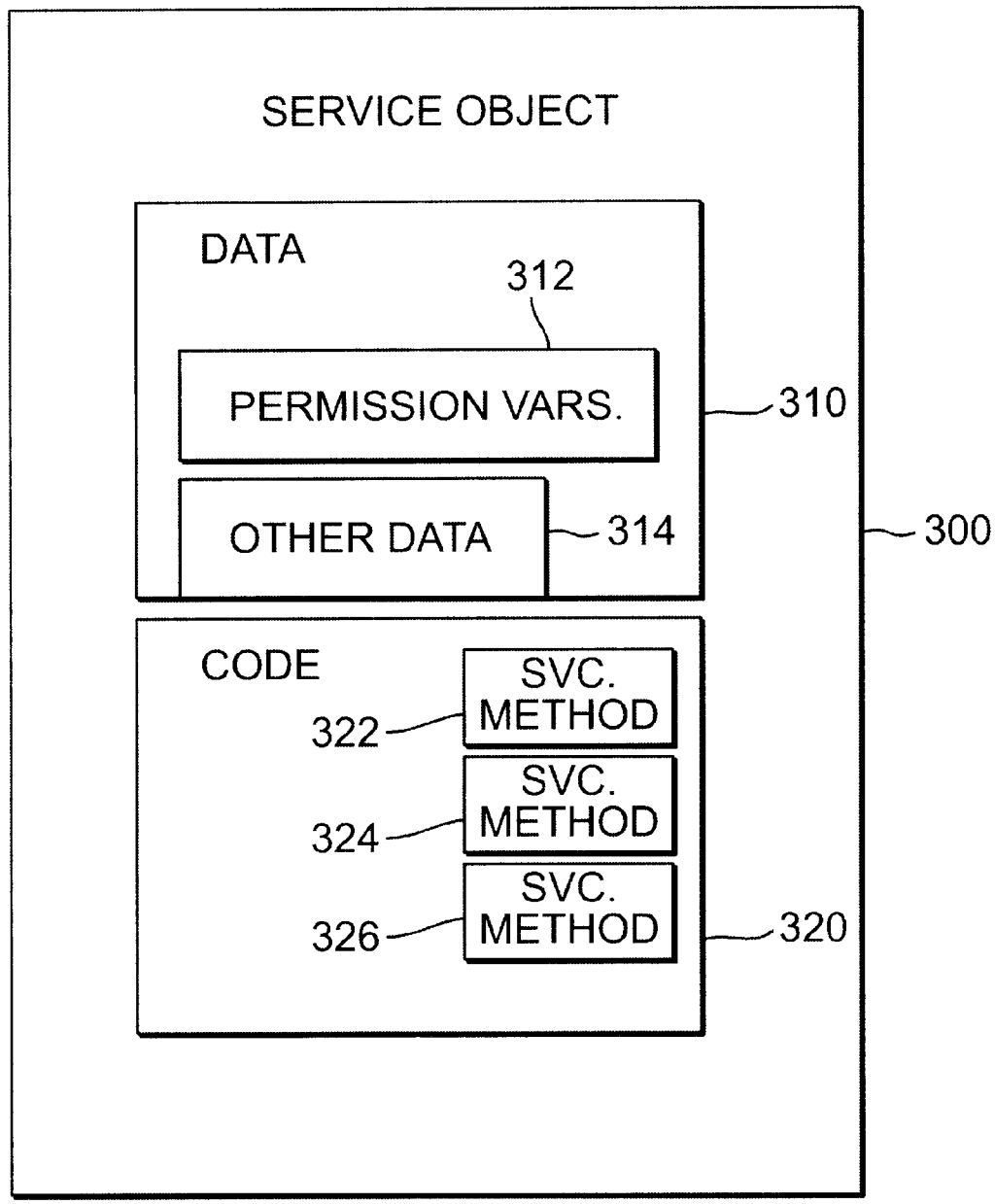
FIG. 5 is a block diagram illustrating a service object instantiated from a service of FIG. 1 according to an embodiment of the present invention.

FIG. 5 is a block diagram illustrating a service object instantiated from service 102 of FIG. 1 according to an embodiment of the present invention. Service object 300 is a Java™ object instantiated from service 102, a class defining a Java™ object. Service object 300 is instantiated for the use of one particular agent, and allows that agent access to a resource. Service object 300 includes data segment 310 and code segment 320. Data segment 310 includes permission variables 312, members of service object 300 which indicate which methods an agent may access and thus to what extent an agent may access the underlying resource. Data segment 310 includes other data 314, which may be necessary for the operation of service object 300. Service object 300 includes code segment 320, which includes methods 322, 324 and 326, allowing agent access to aspects of the underlying resource. Methods 322, 324 and 326 are Java™ language methods. However, service object 300 may include or access non-Java™ language native code—for example, machine code.

Figure 6:
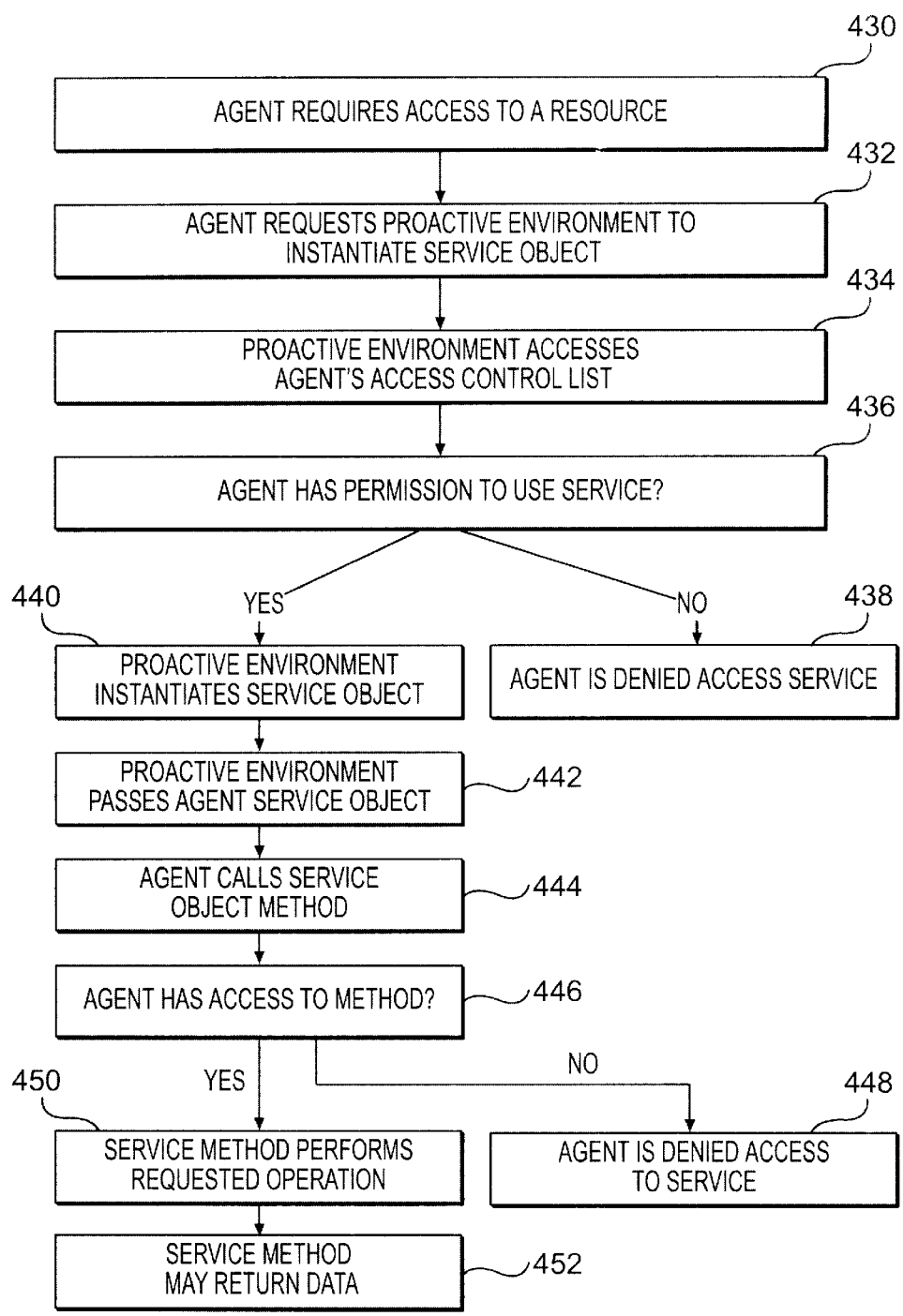
FIG. 6 is a flow chart illustrating the interaction between the instantiated agent and a service of FIG. 1 according to an embodiment of the present invention.

FIG. 6 is a flow chart illustrating the interaction between instantiated agent 110 and service 102 of FIG. 1 according to an embodiment of the present invention.

Referring to FIGS. 1, 4, 5 and 6, in step 430 agent 110 requires access to a resource. For example, agent 110 requires access to operating characteristics stored by port 21, such as the number of dropped packets. Service 102 permits agents limited access to the operating characteristics of port 21 according to an agent's permissioning.

In step 432 agent 110 requests proactive environment 100 to instantiate an object defined by service 102.

In step 434, proactive environment 100 uses methods to read access control list 240 of agent 110.

In step 436, proactive environment 100 uses access control list 240 to determine if agent 110 is an agent which has permission to use service 102 on node 30. If agent 110 does not have permission, proactive environment 100 proceeds to step 438. If agent 110 does have permission, proactive environment 100 proceeds to step 440.

In step 438, agent 110 is denied access to service 102.

In step 440, proactive environment 100 instantiates service object 300 based on the class of service 102. Proactive environment 100 configures service object 300 per the permissioning accessed in step 434. For example, one set of permissioning may allow agent 110 to use service object 300 to read the operating characteristics of port 21 and alter settings for the port, and another set of permissioning may allow agent 110 to use service object 300 only to read the operating characteristics of port 21. Proactive environment 100 sets permission variables 312, members of service object 300, to indicate which aspects of service 102 (in the form of methods 322–326 of service object 300) agent 110 may access.

In step 442, proactive environment 100 passes agent 110 service object 300.

In step 444, agent 110 uses service object 300 by calling one of methods 322–326. For example, if agent 110 calls a port characteristic read method, requesting service 102 to allow agent 110 to read the operating characteristics of port 21, agent 110 passes the service method inputs describing the port name (e.g., "Interface 1") and the field (e.g., dropped packets) requested.

In step 446, the called method determines if agent 110 has access to the particular method requested. If agent 110 has access to the method, per one or more of permission variables 312, the method proceeds to step 450. If agent 110 does not have access to the method, the method proceeds to step 448.

In step 448, agent 110 is denied access to service 102.

In step 450 the service method performs the operation requested by agent 10. For example, the method reads a particular field of the operating characteristics of port 21. Service methods 322–26 are Java™ methods providing access to node 30 and network 4, via JVM 3 and OS 5; the methods are not restricted by the sandbox model.

In step 452 the requested service method may return requested data to agent 110. For example, in the case of reading the operating characteristics of port 21, the service method returns the data as the return value results of a function call.

III. OPERATION

In an exemplary embodiment of the present invention, network congestion conditions are detected and diagnosed by two types of agents. Monitoring agents detect congestion conditions and instantiate trace agents to diagnose the causes of those conditions. One or more monitoring agents are deployed, each positioned at a selected network node supporting a proactive environment. On a given network, monitoring agents may be placed at multiple nodes, typically at key points such as routers. While each monitoring agent remains on one network node, trace agents may move from node to node to diagnose the network condition. Alternate embodiments may not require separate types of agents; for example, a trace agent may both diagnose and trace congestion conditions.

In an exemplary embodiment the operation of each agent is dictated by the controlling method of the agent in combination with a work object and worksheets. In an exemplary embodiment of the present invention, both monitoring agents and trace agents are instantiated from the same class, have the same work object, and have their functioning differentiated by worksheets. Each instantiation of a monitoring or trace agent uses only one worksheet; in alternate embodiments multiple worksheets or no worksheets may be used. Shortly after an agent is instantiated it is passed a work object and a JavaScript™ worksheet by invoking a method which is a member of the agent. The worksheet determines the agent's functionality and differentiates the functionality of a monitoring agent and a trace agent.

Figure 8:
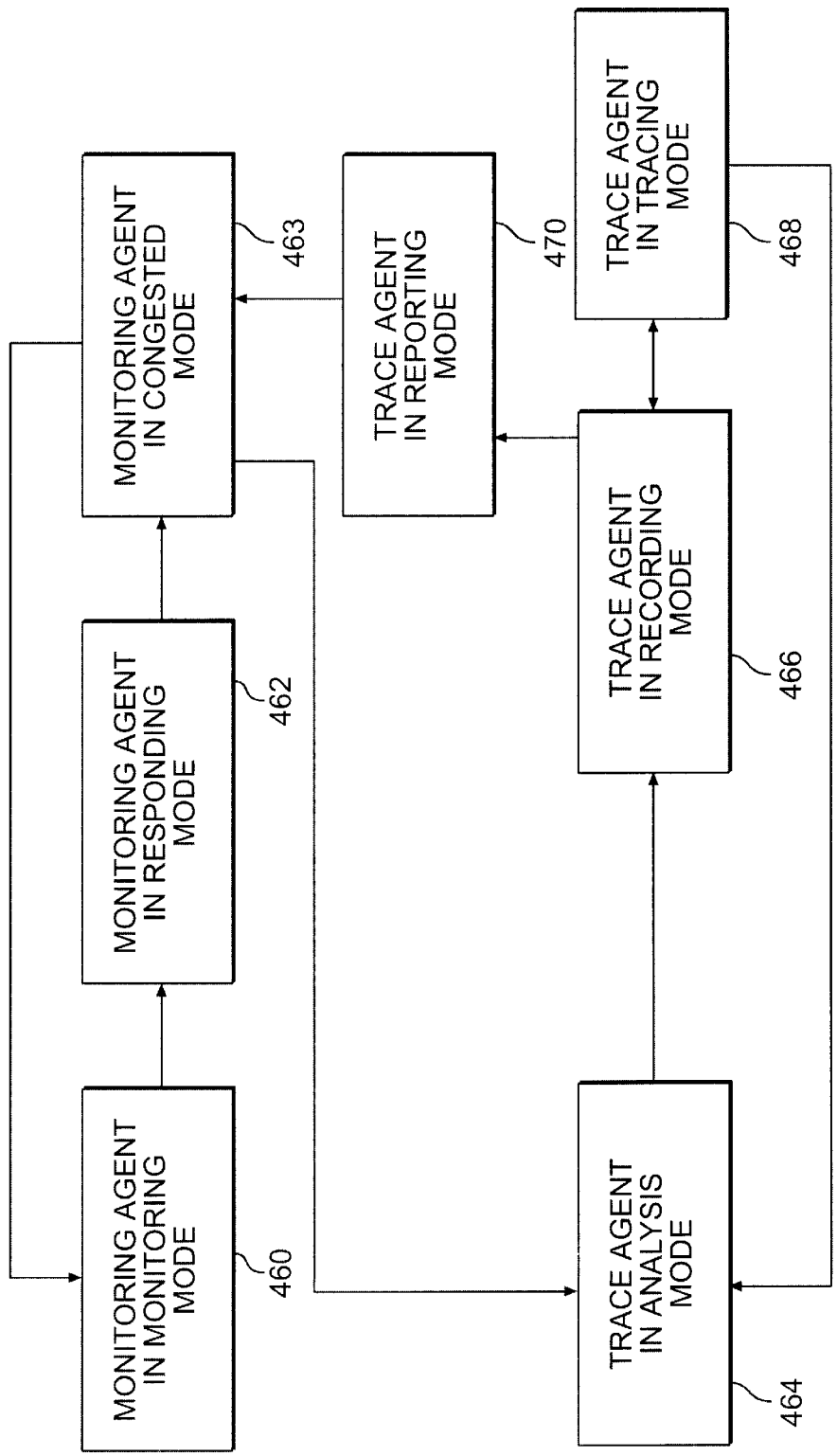
FIG. 8 is a chart illustrating the modes of monitoring agents and trace agents according to an embodiment of the present invention.

Each agent may exist in multiple modes which determine its actions. FIG. 8 is a chart illustrating the modes of monitoring agents and trace agents according to an embodiment of the present invention. Referring to FIG. 8, a monitoring agent may exist in monitoring mode 460, where it monitors for congestion conditions; responding mode 462, where it analyzes congestion; and congested mode 463, where it creates trace agents and waits for trace agents to report. A trace agent may exist in analysis mode 464, where it analyzes traffic; recording mode 466, where it records the result of its analysis on a node or its attempt to move to another node; tracing mode 468, where it attempts to move to another node; and reporting mode 470, where it provides the results of its analysis to the monitoring agent. While specific modes are described, other embodiments may use other modes or sequences of modes without affecting the overall operation or benefits of the present invention. Furthermore, it is not required that modules used with the present invention operate according to modes.

In an exemplary embodiment a monitoring agent detects a network congestion condition by monitoring the number of packets which were to be received at the node on which the monitoring agent operates but which have been lost. The monitoring agent detects lost incoming packets by monitoring the TCP/IP stack, maintained in the operating system. If the number of incoming lost packets rises above a certain level the monitoring agent concludes a congestion condition exists. A monitoring agent uses its worksheet (which in turn uses an SNMP service or another type of service) to periodically access the OS to monitor this information. Alternately, a service may be provided to monitor this information directly.

In alternate embodiments, other methods may be used to monitor for network congestion. For example, the monitoring agent may analyze interface discard counts and queue lengths for each port on the node on which it operates. If interface discard counts and average queue lengths for any port on the node on which it operates rise above a certain level the monitoring agent may conclude a congestion condition exists. In such an embodiment a monitoring agent uses its worksheet (which in turn uses an SNMP service or another type of service) to periodically access each port to monitor these levels. In further embodiments, other port statistics may be monitored, or, for example, CPU utilization on a node or reachability to a given set of network nodes may be monitored. A monitoring agent may be provided with a set of nodes which should be reachable. Periodically, the monitoring agent may attempt to reach these nodes using, for example, a ping command or a Telnet connection (via a service). If the results of this testing indicates unreachability to a node (possibly for a certain duration) congestion may be assumed. Similarly, a worksheet and service may be used to monitor CPU utilization; high CPU utilization may indicate a congestion condition. In alternate embodiments, other traffic may be sorted for and searched for. For example, traffic from a particular process or type of process, rather than a particular host, may be searched for.

The monitoring agent may perform analysis on the data collected in order to filter for and ignore transient or periodic (yet brief) conditions. For example, the monitoring agent may determine that congestion exists every weekday morning from 9:00 to 9:30, and may determine this is not a situation which needs diagnosing. Alternately, a human operator may direct the monitoring agent to ignore certain patterns.

In an exemplary embodiment, on the occurrence of a congestion condition (or after receiving a message from a human operator via, for example, a management console application) the monitoring agent enters the responding mode. For example, a link may be cut, causing excess traffic to flow through the node on which the monitoring agent operates and causing the load on certain ports to increase. The monitoring agent detects this and enters the responding mode.

On entering the responding mode the monitoring agent determines which traffic is most likely to be causing the congestion. The monitoring agent samples a certain number of incoming packets across all ports on the node on which it operates. This may be done in several manners; in an exemplary embodiment, for a fixed amount of time, the monitoring agent takes random samples of incoming packets. The monitoring agent sorts these packets by the node which is the source of the packet. The source of a packet is available as a field in the packet. After collecting a certain number of samples, the monitoring agent creates a source list of sources of incoming packets, ordered by the amount of traffic sent by each source. The source list is a series of entries, each entry containing an IP address for a node. Optionally, the source list may include only the N nodes producing the most traffic, where N is any number, for example, 10. In alternate embodiments a monitoring agent need not develop a list of nodes causing traffic; for example, only one such node may be identified.

After creating the source list the monitoring agent enters the congested mode and uses trace agents to analyze, for each node in the source list, the paths taken by traffic for each of the nodes in the source list. Additional information may be gathered, such as information about other traffic on each link traversed, including the source, destination, and type of the traffic. Serially in time, the monitoring agent selects a node from the source list, instantiates a trace agent to trace traffic for the node, waits for the trace agent to report, destroys the trace agent, and continues the iteration by selecting another node. The monitoring agent may iterate through the entire source list or may select only the N nodes producing the most traffic, where N is some integer, for example 10. In an alternate embodiment multiple trace agents may be launched in parallel, each tracing traffic from one node. In a further embodiment one trace agent may be passed the entire source list and may then iterate down the source list.

Serially in time, and starting at the beginning of the list, the monitoring agent selects a node from the source list (the node which is the source of traffic the trace agent is to trace, termed the given node) and launches a trace agent. The trace agent is launched by being instantiated and being provided with a work object and worksheet which provide the trace agent's functionality and which contains a reference to the given node. After instantiating the trace agent, the monitoring waits for a response from the trace agent. In an alternate embodiment, a trace agent need not be launched by being instantiated; for example, a trace agent may exist and may be launched by being directed to search for traffic.

In an exemplary embodiment a trace agent traverses the network, analyzing the paths taken by traffic between the given node and the node of the trace agent's launch point. The trace agent begins at the node of its launch point and traces traffic originating from the given node. The source of a packet of target traffic may be identified by the sender address in the IP packet. The trace agent follows an iterative process of finding the port for the link on the node on which it operates which is accepting the most traffic from the given node, attempting to traverse that link to a new node, and, once at the new node, again finding the port and link which are accepting the most traffic from the given node. In such a manner the path carrying the most traffic from the given node to the node of the trace agent's launch point may be found. While in an exemplary embodiment only the path which carries the greatest amount of traffic between the given node and the node of the trace agent's launch point is determined, in alternate embodiments a list of paths having the largest fractions of the total congestion traffic is determined. The trace agent may collect other information about traffic on the links it traverses. In other embodiments other characteristics of traffic may be used to trace traffic; for example, a type of traffic may be followed across a network, rather than traffic from a certain source. After collecting this information the trace agent reports to the monitoring agent.

A trace agent may begin tracing traffic at a node other than the node of its launch point. In such a case, the monitoring agent launches the trace agent and directs the trace agent to move to a node which is along the path of the suspected congestion before starting tracing.

When first instantiated, the trace agent is in analysis mode. In analysis mode the trace agent searches the various ports on the node on which it operates (initially the node of its launch point) for incoming traffic from the given node. The trace agent determines which port is accepting the greatest proportion of such traffic from the given node. In determining which port is accepting the greatest proportion of such traffic, the trace agent thus detects which link connected to the node is accepting and carrying the greatest proportion of such traffic. The trace agent does not analyze ports for links it has previously traversed for the given node. The trace agent accesses its node path list to determine whether or not a link has been previously traversed. The node path list is a data structure recording the nodes and ports which a trace agent has visited along with other information, such as the failure to traverse a link or to detect traffic from the given node.

The trace agent follows a procedure similar to that of the monitoring agent for determining which port is accepting the most traffic from the given node. The trace agent samples a certain number of incoming packets, over a certain period of time, across all ports on the node, ignoring ports connected to links previously traversed for the given node. The trace agent may collect, analyze, and report on information in addition to that on the path of packets from the given node.

If no such traffic is found (for example, if the given node has ceased transmitting excessive traffic), the trace agent enters the recording mode and records in its node path list both its failure to find traffic from the given node and the identity of the node on which it is currently operating. The trace agent then enters the reporting mode, described below, where it reports this failure to the monitoring agent, and is destroyed.

If the trace agent can identify a certain link carrying the most traffic from the given node (using information gathered from the port connected to the link), the trace agent enters the recording mode and records in its node path list the node on which it is currently operating and the port which is accepting this traffic. In alternate embodiments the trace agent may record other information. For example, the trace agent may record information about the type of packets which are included in the traffic on the port recorded. Alternate embodiments may use another method to categorize the traffic to be traced. For example, a trace agent may trace traffic based on the type of traffic, and choose a link to traverse based on the type of traffic on the link.

In alternate embodiments, information about traffic sent from each port (as opposed to received) may be analyzed and acted upon. For example, a trace agent may choose a link to follow based on the amount of traffic sent between a first node and a second node, rather than on the traffic sent from the second node to the first node.

After determining which port is accepting the most traffic from the given node, the trace agent transitions to the tracing mode, and attempts to move to the node on the other end of the link associated with this port. If the trace agent successfully traverses this link, the trace agent, now on a new node, transitions to the analysis mode, described above, and repeats the cycle of analyzing ports on a node and then moving to another node.

If the trace agent cannot traverse the link (for example, if the destination node has failed or does not support a proactive environment, if the trace agent is not granted permission to operate on the destination node, or if the link is overloaded) the trace agent first enters the recording mode and records in its node path list that it failed to traverse the link, along with the identity of the node on which it is operating and the port connected to the link which it failed to traverse. The trace agent then transitions to the reporting mode. On transitioning to the reporting mode, the trace agent has traced the traffic as far as it can. Congestion traffic may be flowing from another network or from a node or nodes which are outside the domain in which trace agents may operate. Thus the trace agent may determine the point at which congestion traffic enters a network or administrative domain, and the path which the agent determines may be a path leading to the entry point.

In the reporting mode, the trace agent traverses the network to the node of its launch point (the node supporting the monitoring agent which created the trace agent) and reports its findings to the monitoring agent. The trace agent transmits the data it has collected to the monitoring agent using a messaging service. After reporting to the monitoring agent, the trace agent is destroyed, and the monitoring agent instantiates another trace agent using as the given node the next node on the source list, if any, repeating the process. In an alternate embodiment the trace agent is not destroyed after reporting to the monitoring agent, but may be reused with the next node on the source list.

In an exemplary embodiment, the trace agent provides to the monitoring agent a report indicating, for each link traversed by the trace agent, the amount of traffic on that link which originates at the given node. In addition, the trace agent may provide, for each link traversed, the source/destination pairs contributing the most traffic to that link. A source/destination pair is a pair of nodes where traffic is sent from one node to another, or where traffic flows between the two nodes. Such information may be compared to the known capacity of each link. Links may be denoted using pairs of port/node combinations. For example, a link may be denoted as the link connecting port "Interface 2" on node 22.49.1.3 to port "Interface 4" on node 22.49.1.7. In alternate embodiments the findings may include other types of information, such as the type of traffic recorded or information about packets transmitted by each port in addition to information about packets received.

In an alternate embodiment the trace agent need not traverse to its launch point to report its findings; for example, it may transmit the information across the network using a messaging service and then self-destruct.

After receiving a response for all nodes in the source list the monitoring agent may report findings (e.g., the source of the congestion or the paths of the congestion) to a network administrator. The monitoring agent transitions to the monitoring mode. In an exemplary embodiment the monitoring agent communicates with network administrators via a management console application; in alternate embodiments agents may use other methods. The network administrator may use the findings to cure the problem by, for example, altering routing tables, increasing the capacity of certain links or equipment, or altering the functionality of nodes. Alternately, the monitoring agent may attempt to correct the problem. For example the monitoring agent may create an agent which alters routing tables.

Figure 7:
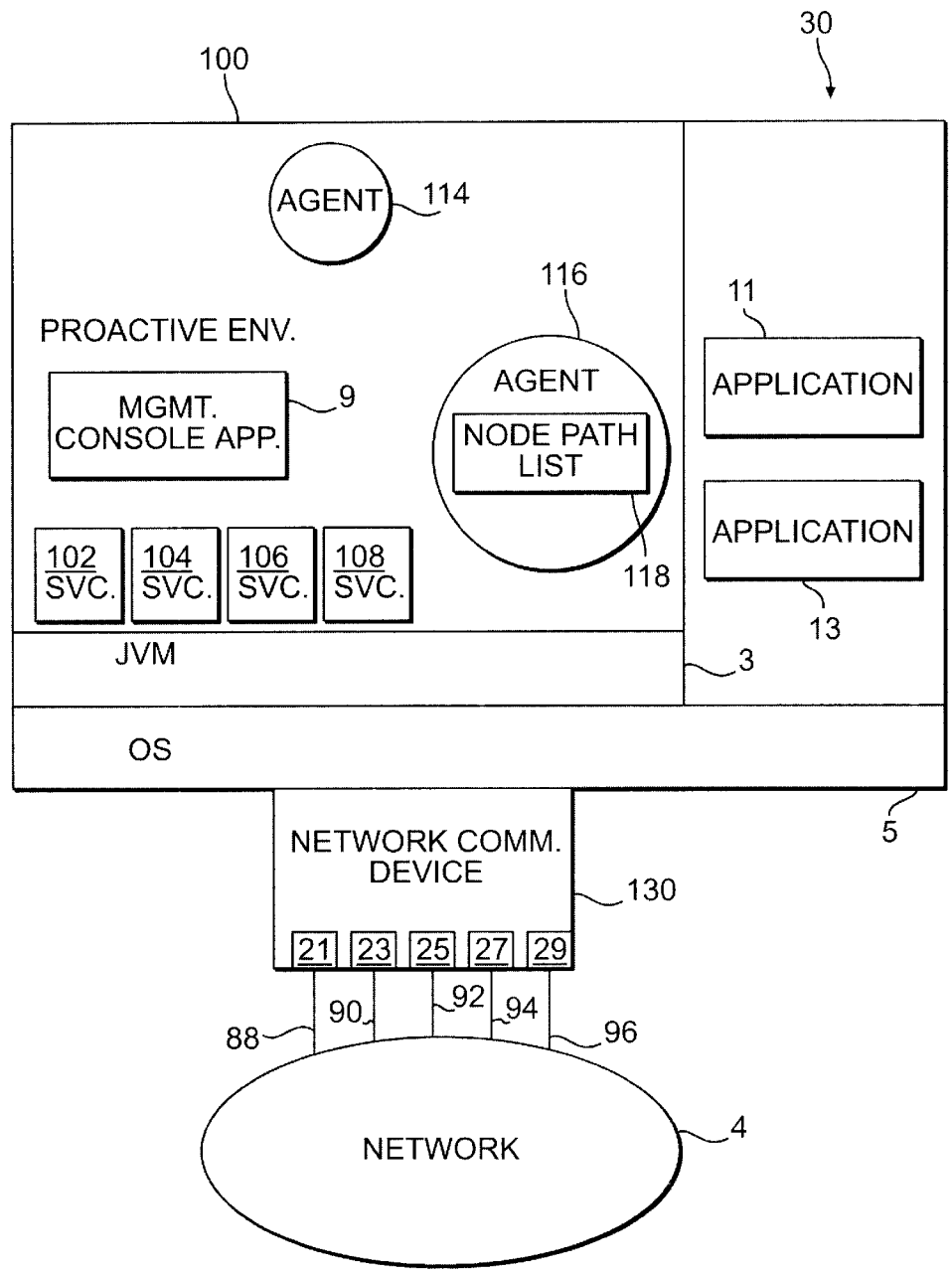
FIG. 7 is a block diagram illustrating the node of FIG. 1 according to an embodiment of the present invention.

FIG. 7 is a block diagram illustrating node 30 of FIG. 1 according to an embodiment of the present invention. FIGS. 1 and 7 illustrate node 30 from different aspects; thus like numbered components are identical in function and structure. Node 30 includes proactive environment 100, which includes services 102, 104, 106 and 108. Node 30 includes OS 5, JVM 3, applications 11 and 13, management console application 9, monitoring agent 114 and trace agent 116. Monitoring agent 114 monitors network traffic entering node 30, detects network congestion conditions, and, in response, may launch trace agents to diagnose network congestion. Trace agent 116 is created by monitoring agent 114 and traverses the network, gathering information about selected traffic. Trace agent 116 includes node path list 118, a data structure which is a member of trace agent 116. Network communications device 130 allows node 30 to connect to network 4 via links 88, 90, 92, 94, and 96 and includes ports 21, 23, 25, 27 and 29. Links 88–96 connect to other nodes (not shown) in network 4.

Monitoring agent 114 and trace agent 116 are instantiations of the same subclass of the base agent object class. Each is provided with one JavaScript™ worksheet which provides functionality to monitoring agent 114; the two types of worksheets differ and result in the differing functionality of monitoring agents and trace agents.

Figure 9:
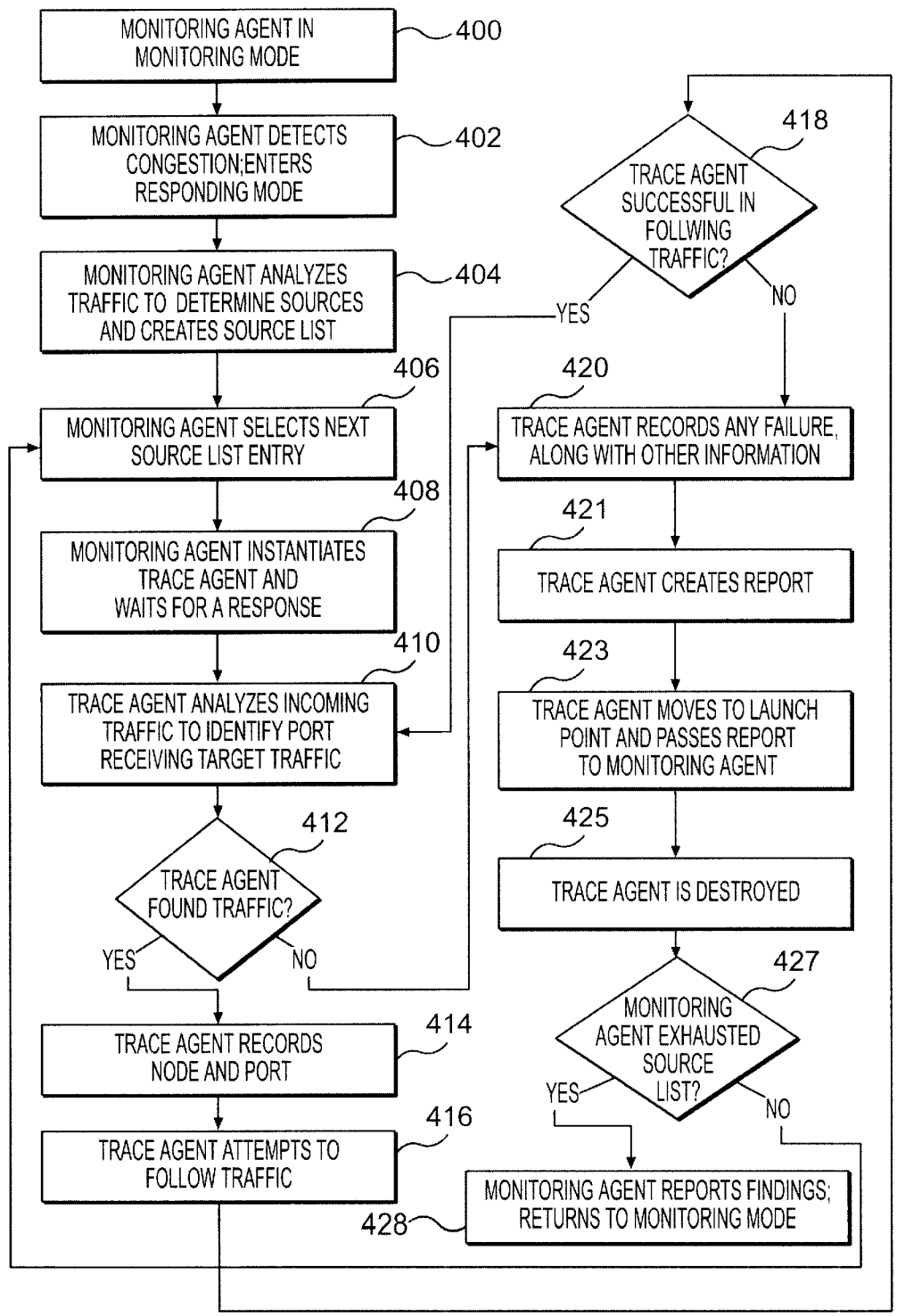
FIG. 9 is a flow chart illustrating the operation of monitoring agents and trace agents according to an embodiment of the present invention.

FIG. 9 is a flow chart illustrating the operation of monitoring agents and trace agents according to an embodiment of the present invention. While specific steps are described, other embodiments may use other steps and sequences of steps without affecting the overall operation or benefits of the present invention.

Referring to FIGS. 7, 8 and 9, in step 400 monitoring agent 114 is in the monitoring mode (FIG. 8, 460). The mode for monitoring agent 114 is recorded as a variable in its state. When monitoring agent 114 is instantiated, this variable is initialized to indicate the monitoring mode, and this variable is changed when the mode is changed. At this step, trace agent 116 is not yet instantiated.

In step 402 monitoring agent 114 detects a congestion condition and enters the responding mode (FIG. 8, 462). Monitoring agent 114 detects a high number of lost incoming packets by monitoring the TCP/IP stack. Alternately, monitoring agent 114 reacts to input from a human operator to enter responding mode.

In step 404 monitoring agent 114 analyzes traffic being received at node 30 to determine which traffic is most likely causing congestion and creates a source list of the sources of this traffic. Monitoring agent 114 samples incoming packets from each of ports 21–29, determines the amount of traffic sent by each source, sorts these sources by the amount of such traffic, and creates a source list of sources of incoming packets, ordered by the amount of traffic. Monitoring agent 114 uses its worksheet to use one or more of services 102–108 to access ports 21–29. Each service is instantiated once and remains in existence for the duration of the analysis by monitoring agent 114 of the ports or ports accessed by the service. Monitoring agent 114 periodically calls methods which are members of service objects to access port data.

In step 406 monitoring agent 114 enters the congested mode (FIG. 8, 463) where it selects the next entry in the source list; if the iteration is at its start, this is the first entry.

In step 408 monitoring agent 114 instantiates trace agent 116 and waits for a response from trace agent 116. Trace agent 116 is instantiated in the analysis mode (FIG. 8, 464), using the node determined in step 406, the given node. To instantiate trace agent 116, monitoring agent 114 uses the "new" keyword, using a subclass of the base agent object class. Monitoring agent 114 sends trace agent 116 its work object and the JavaScript™ worksheet which provide functionality to trace agent 116 by invoking methods which are members of trace agent 116. The methods add the work object and worksheet to trace agent 116. The worksheet contains a variable denoting the node for which the trace agent 116 is to trace traffic, the given node. The mode for trace agent 116 is recorded as a variable in its state. When trace agent 116 is instantiated, this variable is initialized to indicate the analysis mode, and this variable is changed when the mode is changed.

In step 410 trace agent 116, in the analysis mode, analyzes traffic being received at the node on which it operates, its current node, to identify the port receiving the most target traffic (traffic from the given node). The initial current node is the node of the launch point of trace agent 116, node 30. Trace agent 116 searches the various incoming ports of the current node for target traffic. Trace agent 116 uses its worksheet to use services to access ports on the current node, ignoring ports connected to links that it may have already traced for the given node. Trace agent 116 samples packets received at its current node to determine the port accepting the most traffic from the given node.

In step 412, if trace agent 116 found traffic from the given node on a port on the current node in step 410, trace agent 116 proceeds to step 414; if trace agent 116 did not find such traffic, trace agent 116 proceeds to step 420.

In step 414, trace agent 116 enters the recording mode (FIG. 8, 466) and records the name of the current node and the name of the port receiving the most traffic from the given node. This information is recorded in node path list 118. Trace agent 116 records the node name of the current node (the node's EP address) and the port name of the port receiving the most traffic from the given node (e.g., "Interface 2").

In step 416, trace agent 116 transitions to the tracing mode (FIG. 8, 468) and attempts to follow the target traffic. Trace agent 116 attempts to move to the node on the other end of the link connected to the port recorded in step 414. In such a manner trace agent 116 attempts to move closer to the source of the traffic which may be contributing to the congestion.

In step 418, if trace agent 116 is successful in following the traffic by traversing the link, trace agent 116 proceeds to step 410; if trace agent 116 is unsuccessful, trace agent 116 proceeds to step 420. In proceeding to step 410, the node to which trace agent 116 moves becomes the current node, trace agent 116 enters the analysis mode, and trace agent 116 repeats steps 410–416, having moved closer to the source of the congestion.

In step 420, trace agent 116 transitions to the recording mode (FIG. 8, 466). Trace agent 116 records any failure, along with other information (depending on the cause of a failure), in node path list 118. Trace agent 116 may record the current node and the port connected to the link of a failure.

In step 421, trace agent 116 transitions to the reporting mode (FIG. 8, 470) and creates a report, a data structure detailing the information collected. The report may indicate, for each link traversed by trace agent 116, the amount of traffic on that link which originates at the given node; the report may include other information.

In step 423, trace agent 116 traverses network 4 to the launch point and passes its report to monitoring agent 114. Trace agent 116 uses its move method to move from its current node to the node of its launch point. Trace agent 116 passes the report to monitoring agent 114 using a messaging service. Trace agent 116 requests the proactive environment of the launch point to instantiate a messaging service, and calls a method of the messaging service with the report as a parameter. The messaging service transfers the report to monitoring agent 114.

In step 425, trace agent 116 is destroyed. It is known in the art to destroy an object which has been instantiated.

In step 427, if monitoring agent 114 has exhausted the source list, monitoring agent 114 proceeds to step 428; if there additional entries in the source list, monitoring agent 114 proceeds to step 406.

In step 428, monitoring agent 114 returns to the monitoring mode and may report the findings (e.g., the source of the congestion) to a network administrator. Alternately, monitoring agent 114 may attempt to correct the problem.

IV. CONCLUSION

Several embodiments of the present invention are specifically illustrated and/or described herein. However, it will be appreciated that modifications and variations of the present invention are covered by the above teachings and are within the purview of the appended claims without departing from the spirit and intended scope of the invention.

What is claimed is:

1. A method for analyzing a network, the network comprising nodes, each node connecting to a set of links, the method comprising:

at a first node on the network monitoring for a congestion condition; and at the first node, if a congestion condition is detected, determining a set of traffic suspected to be congestion traffic and launching an agent, the agent recording information about traffic by:

detecting which among the links of the node at which the agent currently operates is receiving the most of the set of traffic suspected to be congestion traffic;

selecting a link found to be receiving the most of the subset of the set of traffic suspected to be congestion traffic and recording the identity of the selected link; and attempting to move to the node connected to the selected link.

2. The method of claim 1 where the agent repeats detecting, selecting and attempting to move until the agent fails to perform one of detecting, selecting and attempting to move.

3. The method of claim 2 including, before launching the agent:

recording a set of samples of traffic receive at the first node; and creating a list entries of sources producing traffic.

4. The method of claim 3 where the agent records the path of traffic produced by one entry in the list.

5. The method of claim 3 where the agent records the path of traffic produced by each entry in the list.

6. The method of claim 4 where the agent provides a report to a process executing on the first node.

7. The method of claim 2 where the information about the traffic includes at least a set of paths taken by the traffic.

8. The method of claim 2 where monitoring for a congestion condition is performed by a monitoring agent.

9. The method of claim 2 where the traffic suspected to be congestion traffic is traffic from a set of sender nodes.

10. The method of claim 9 where the agent detects which among the links of the node at which the agent currently operates is receiving the most of a subset of the set of traffic suspected to be congestion traffic by determining which of the links is receiving the most traffic from a selected node of the set of sender nodes.

11. The method of claim 10 where, when launched, the agent is given one node from the set of sender nodes, where the agent records information about traffic from the one node.

12. A system for analyzing traffic on a network, the network comprising nodes, each node having a set of links, the system comprising:

a first node having an agent for monitoring traffic, the agent for monitoring traffic having a monitoring code segment and a monitoring data segment; and an agent for tracing traffic having a tracing code segment and a tracing data segment, the agent for tracing traffic gathering information about the traffic on the network by repeatedly;

identifying which of the links on the node on which the agent for tracing traffic operates accepts a class of traffic; and traversing the identified link to the node across the link.

13. The system of claim 12 where the agent for monitoring traffic monitors for a congestion condition.

14. The system of claim 12 where the class of traffic is traffic from one of the nodes of the network.

15. The system of claim 12 where after the agent for tracing traffic identifies a link, the agent for tracing traffic records the node on which the agent for tracing traffic operates and the identified link.

16. The system of claim 12 where the agent for tracing traffic records a set of traffic paths, each traffic path specifying traffic flowing between the first node and one of the other nodes on the network.

17. A set of instructions residing in a storage medium, said set of instructions capable of being executed by a processor to implement a method for analyzing a network, the network comprising nodes, each node connecting to a set of links, the method comprising:

at a first node on the network monitoring for a congestion condition; and at the first node, if a congestion condition is detected, determining a set of traffic suspected to be congestion traffic and launching an agent, the agent recording information about traffic by:

detecting which among the links of the node at which the agent currently operates is receiving the most of a subset of a set of traffic suspected to be congestion traffic;

selecting a link found to be receiving the most of the subset of the set of traffic suspected to be congestion traffic and recording the identify of the selected link;

attempting to move to the node connected to the selected link; and repeating the detecting, selecting and attempting to move substeps until the agent fails to perform one of the detecting, selecting and attempting to move substeps.

\* \* \* \* \*

UNITED STATES PATENT AND TRADEMARK OFFICE
CERTIFICATE OF CORRECTION

PATENT NO. : 6,587,432 B1
DATED : July 1, 2003
INVENTOR(S) : David M. Putzolu et al.

It is certified that error appears in the above-identified patent and that said Letters Patent is hereby corrected as shown below:

Column 13,
Line 32, "by agent 10." should read -- by agent 110. --

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,587,432 B1
DATED : July 1, 2003
INVENTOR(S) : David M. Putzolu et al.

It is certified that error appears in the above-identified patent and that said Letters Patent is hereby corrected as shown below:

Title page,
Item [75], Inventors, should read as follows:
-- [75] Inventors: David M. Putzolu, Forest Grove, OR (US); Rajendra Yavatkar, Portland, OR (US) --

Signed and Sealed this

Twenty-first Day of December, 2004

JON W. DUDAS
*Director of the United States Patent and Trademark Office*